(12) United States Patent
Williamson

(10) Patent No.: US 7,806,558 B2
(45) Date of Patent: Oct. 5, 2010

(54) METHODS AND APPARATUS FOR PROVIDING UNIFORM PROJECTION LIGHTING

(75) Inventor: Ryan C. Williamson, Somerville, MA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 400 days.

(21) Appl. No.: 11/945,480

(22) Filed: Nov. 27, 2007

(65) Prior Publication Data

US 2008/0123057 A1     May 29, 2008

Related U.S. Application Data

(60) Provisional application No. 60/867,206, filed on Nov. 27, 2006.

(51) Int. Cl.
*F21V 33/00* (2006.01)
(52) U.S. Cl. .................. 362/241; 362/249.02; 362/237; 362/800
(58) Field of Classification Search .................. 362/800, 362/249.02, 249.06, 237, 238, 247, 241
See application file for complete search history.

(56) References Cited

U.S. PATENT DOCUMENTS

| | | | |
|---|---|---|---|
| 6,367,949 B1 | 4/2002 | Pederson | |
| 6,367,950 B1 | 4/2002 | Yamada et al. | |
| 7,070,312 B2 * | 7/2006 | Tatsukawa | 362/545 |
| 2003/0072156 A1 * | 4/2003 | Pohlert et al. | 362/244 |
| 2003/0193802 A1 * | 10/2003 | Luk | 362/249 |
| 2004/0184270 A1 | 9/2004 | Halter | |

FOREIGN PATENT DOCUMENTS

| | | |
|---|---|---|
| DE | 10016381 A1 | 10/2001 |
| GB | 2401928 A | 11/2004 |

* cited by examiner

*Primary Examiner*—Laura Tso

(57) ABSTRACT

A projection lighting fixture includes multiple LED packages (e.g., chip-on-board or surface mount LED assemblies including one or more LED junctions) disposed on a common mounting board or substrate. Each LED package is associated with a corresponding collimator. The common mounting board on which the multiple LED package/collimator pairs are disposed includes a reference axis in the plane of the board (e.g., a vertical or horizontal axis of the board). One or more of the LED packages are disposed on the common mounting board such that they are rotated clockwise or counter-clockwise with respect to the reference axis, so that at least two of the LED packages have different rotations. The light projected from the respective collimators associated with the multiple LED packages at least partially overlaps in a target illumination field, and the different rotations of at least two of the LED packages facilitates substantially uniform illumination in the target illumination field.

16 Claims, 6 Drawing Sheets

METHODS AND APPARATUS FOR PROVIDING UNIFORM PROJECTION LIGHTING

CROSS-REFERENCE TO RELATED APPLICATION

The present application claims the benefit, under 35 U.S.C. §119(e), of U.S. provisional application Ser. No. 60/867,206, filed Nov. 27, 2006, entitled "LED-Based Projection Lighting Fixtures with Collimating Optics," which application is hereby incorporated herein by reference.

FIELD OF THE INVENTION

The present invention generally relates to projection lighting fixtures and methods for arranging light sources and optical structures within such fixtures to provide substantially uniform projection lighting.

BACKGROUND

Projection lighting fixtures concentrate light in a specific direction. These fixtures have been used for many years in various theater, television, architectural, and general illumination applications (e.g., overhead projection, spotlight illumination, semiconductor assembly, medical/scientific instrumentation, illumination of airport runways and high-rise buildings, etc.). Typically, these fixtures include an incandescent or a gas-discharge lamp mounted adjacent to a concave reflector, which reflects light through a lens assembly to project a narrow beam of light over considerable distance towards a target object.

In recent years, light-emitting diodes (LEDs) also have been used in some types of projection lighting fixtures. In particular, surface mount or chip-on-board assemblies of single or multiple LEDs have attracted attention in the industry for use in applications requiring high luminance combined with narrow-beam light generation (to provide tight focusing/low geometric spreading of illumination). A "chip-on-board" (COB) LED assembly refers generally to one or more semiconductor chips (or "dies") in which one or more LED junctions are fabricated, wherein the chip(s) is/are mounted (e.g., adhered) directly to a printed circuit board (PCB). The chip(s) is/are then wire bonded to the PCB, after which a glob of epoxy or plastic may be used to cover the chip(s) and wire connections. One or more such LED assemblies, or "LED packages," in turn may be mounted to a common mounting board or substrate of a lighting fixture.

For some narrow-beam applications involving LED chips or dies, optical elements may be used together with the LED chip-on-board assembly to facilitate focusing of the generated light to create a narrow-beam of collimated light. Collimated light is light whose rays are parallel and thus has a planar wavefront. Optical structures for collimating visible light, often referred to as "collimator lenses" or "collimators," are known in the art. These structures capture and redirect light emitted by a light source to improve its directionality. One such collimator is a total internal reflection ("TIR") collimator. A TIR collimator includes a reflective inner surface that is positioned to capture much of the light emitted by a light source subtended by the collimator. The reflective surface of conventional TIR collimators is typically conical, that is, derived from a parabolic, elliptical, or hyperbolic curve.

Referring to FIG. 1, a conventional TIR collimator 100 collects the light emitted by an LED light source 112 (which may include an LED chip-on-board assembly, or "LED package," including one or more LED junctions) and directs the light so that it exits the collimator at a top portion 113. Some of the light travels from source 112 through a primary optic 114, into a first cavity 116, through a centrally-located lens 118, and out via a second cavity 120. The remainder of the light exits via a transparent surface 122 or a flange 124, which is used to retain collimator 100 in a holder (not shown). The light that does not pass through the central lens is incident on an inner sidewall 126 and is refracted as it passes from the air in the first cavity into the plastic material of the collimator. Thereafter, it is reflected at an inner reflective surface 129. The reflected light is refracted again as it travels from the plastic body of the collimator to the ambient air, at transparent surface 122. The reflective surface is conical, so that a cross-sectional profile of the collimator is parabolic at the reflective surface, as shown in FIG. 1.

In the collimator shown in FIG. 1, the reflection at reflective surface 129 occurs by total internal reflection, establishing constraints on the overall shape and curvature of the cross-sectional profile of the reflective surface. Due to the difference between the refractive index of collimator 100 and the refractive index of the ambient air, Snell's law applies and defines a critical angle for the angle of incidence, which is made by an incident light ray with respect to a normal to the reflective surface. That is, for incident angles above the critical angle, all of the light is reflected and none is transmitted through the reflective surface 129 or along the surface 129, thereby providing total internal reflection. For a plastic (refractive index of about 1.59)-air (refractive index of 1) interface, the critical angle is about 39 degrees. Thus, the reflective surface 129 is sloped to provide an angle of incidence for most of the light that is greater than about 39 degrees.

In theory, conventional collimators are capable of producing perfectly collimated light from an ideal point source at the focus. However, when these collimators are used in real-life applications with a light source of an appreciable surface area (such as an LED light source), the light is not completely collimated, but rather is directed into a diverging conic beam. For example, the light output from a conventional LED source (e.g., a COB LED assembly) may be emitted in a cone having a beam divergence of approximately 110 degrees (i.e., approximately 55 degrees to either side of a central axis in a direction of light propagation), and a collimator similar to that shown in FIG. 1 may redirect the generated light into a narrower cone-shaped beam having a divergence of approximately 10 degrees (i.e., approximately 5 degrees to either side of the central axis).

In some narrow-beam applications involving an LED package (e.g., a COB LED assembly including one or more junctions) and a corresponding collimator, the phenomenon of chip or die imaging may be problematic. In particular, with relatively small collimators used in conjunction with an LED package, the generally square or rectangular shape of the light emitting portion of an LED package (i.e., the arrangement of one or more chips in the package) may create a similar square or rectangular shape in the far field irradiance distribution pattern of the light projected from the collimator. In this manner, the square or rectangular shape of the light emitting portion of the LED package may be "imaged" in the far field due to collimation, which may result in undesirable irradiation non-uniformity in some circumstances. Moreover, with LED packages including multiple junctions that generate respective different wavelengths of light ("multi-color packages," such as RGGB, BGGA and RGBW), the challenge of narrow-beam optical design is even greater, due to the color disparity within the package.

SUMMARY OF INVENTION

Various embodiments of the present invention are directed generally to LED-based projection lighting fixtures, and methods for arranging light sources and optics in such fixtures so as to facilitate uniform illumination in a target illumination field.

In one exemplary embodiment, a projection lighting fixture includes multiple LED packages (e.g., chip-on-board or surface mount LED assemblies each including one or more LED junctions) disposed on a common mounting board or substrate, wherein each package is associated with a corresponding collimating optical system ("collimator"). In one aspect, the common mounting board on which the multiple LED packages are disposed includes a reference axis in the plane of the board (e.g., a vertical or horizontal axis of the board). One or more of the LED packages are disposed on the board such that they are rotated clockwise or counter-clockwise with respect to the reference axis, so that at least two of the LED packages have different rotations. The light projected from the respective collimators associated with the multiple LED packages at least partially overlaps in a target illumination field, and the different rotations of at least two of the LED packages facilitates substantially uniform illumination in the target illumination field.

As discussed in greater detail below, one embodiment of the present invention is directed to a lighting apparatus, comprising an essentially planar mounting board having a first reference axis in a first plane defined by the mounting board and a plurality of LED-based light sources disposed on the mounting board. Each light source has a second reference axis indicating an orientation of the light source, the second reference axis for each light source being designated identically for all light sources of the plurality of light sources. The plurality of LED-based light sources are disposed on the mounting board such that a first orientation of a first light source of the plurality of light sources, relative to the first reference axis of the mounting board, is different from at least one other orientation of at least one other light source of the plurality of light sources relative to the first reference axis of the mounting board.

Another embodiment of the present invention is directed to a method for providing uniform projection lighting, the method comprising arranging a plurality of LED-based light sources on an essentially planar mounting board such that at least two LED-based light sources of the plurality of LED-based light sources have different orientations on the common mounting board. The plurality of LED-based light sources, when energized, project a corresponding plurality of collimated light beams toward a target illumination field, the beams at least partially overlapping in the target illumination field.

Another embodiment of the present invention is directed to a projection lighting fixture, comprising an essentially planar mounting board having a first reference axis in a first plane defined by the mounting board, and a plurality of LED packages disposed on the mounting board. Each LED package comprises a chip-on-board assembly of multiple LED chips and a collimator coupled to the chip-on-board assembly. Each LED package has a second reference axis indicating an orientation of the package, the second reference axis for each package being designated identically for all packages of the plurality of packages. The plurality of LED packages are disposed on the mounting board such that each package has a unique orientation relative to the first reference axis of the mounting board.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like.

In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "color temperature" generally is used herein in connection with white light, although this usage is not intended to limit the scope of this term. Color temperature essentially refers to a particular color content or shade (e.g., reddish, bluish) of white light. The color temperature of a given radiation sample conventionally is characterized according to the temperature in degrees Kelvin (K) of a black body radiator that radiates essentially the same spectrum as the radiation sample in question. Black body radiator color temperatures generally fall within a range of from approximately 700 degrees K (typically considered the first visible to the human eye) to over 10,000 degrees K; white light generally is perceived at color temperatures above 1500-2000 degrees K.

Lower color temperatures generally indicate white light having a more significant red component or a "warmer feel," while higher color temperatures generally indicate white light having a more significant blue component or a "cooler feel." By way of example, fire has a color temperature of approximately 1,800 degrees K, a conventional incandescent bulb has a color temperature of approximately 2848 degrees K, early morning daylight has a color temperature of approximately 3,000 degrees K, and overcast midday skies have a color temperature of approximately 10,000 degrees K. A color image viewed under white light having a color temperature of approximately 3,000 degree K has a relatively reddish tone, whereas the same color image viewed under white light having a color temperature of approximately 10,000 degrees K has a relatively bluish tone.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED light sources as discussed above, alone or in combination with other non LED light sources.

It should be appreciated that all combinations of the foregoing concepts and additional concepts discussed in greater detail below are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Following below are more detailed descriptions of various concepts related to, and inventive embodiments of, methods and apparatus according to the present disclosure for providing uniform projection lighting. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

Figure 2:
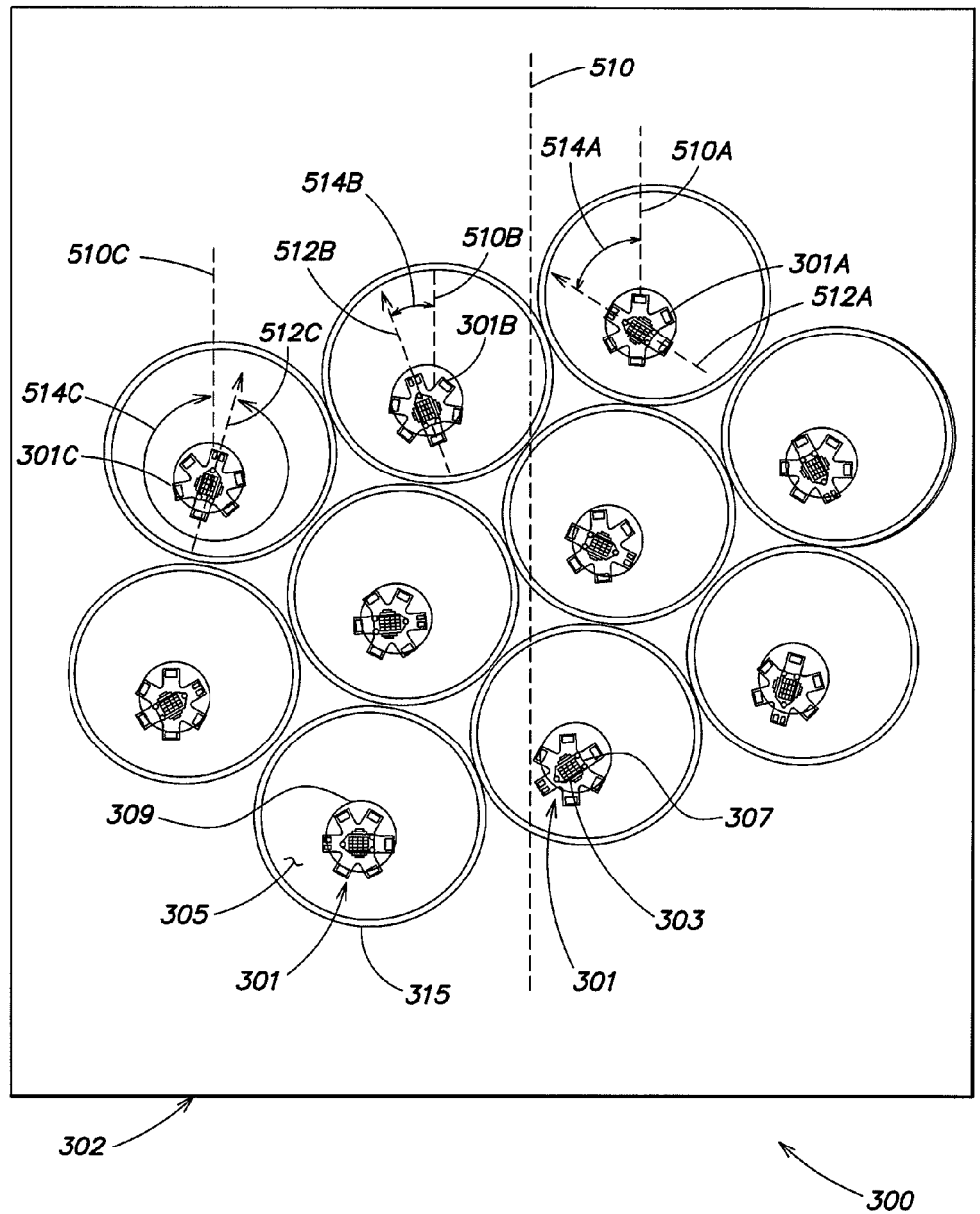
FIG. 2 illustrates a simplified top perspective view of an exemplary projection lighting fixture according to one embodiment of the present invention.

FIG. 2 illustrates a simplified top perspective view of an exemplary projection lighting fixture 300, according to one embodiment of the present invention. The lighting fixture 300 includes a plurality of light sources 301 disposed on a common mounting board 302. In one aspect of this embodiment, each of the light sources 301 may comprise an "LED package," e.g., a chip-on-board LED assembly including one or more semiconductor chips (or "dies") in which one or more LED junctions are fabricated, wherein the chip(s) is/are mounted (e.g., adhered) directly to a printed circuit board (PCB). In the exemplary fixture of FIG. 2, each of the light sources 301 is depicted for purposes of illustration as including one or more essentially rectangular LED chips 303 disposed on a corresponding hexagonal shaped PCB 307, wherein each light source 301 comprising the chip(s) 303 and the PCB 307 is in turn disposed on the common mounting board 302.

In various aspects, a given light source 301 of the lighting fixture 300 shown in FIG. 2 may include a single LED junction formed on a single chip 303, or multiple LED junctions formed on multiple chips 303 and disposed on the same PCB 307. For example, in one aspect, a given light source 301 including one or more LED junctions generates essentially a single spectrum of radiation when energized. In other implementations, a given light source 301 may be a "multi-color LED package" and include multiple LED junctions (e.g., multiple chips 303) that generate multiple different spectrums of radiation when energized. Thus, it should be appreciated that a given lighting fixture 300 according to the present invention may be configured to generate essentially a single spectrum of radiation (in which each light source 301 generates essentially a same spectrum of radiation), or may be configured to generate multiple spectrums of radiation (in which some or all of the light sources 301 are multi-color LED packages). In one exemplary implementation, one or more light sources 301 of the fixture 300 may be a Cree® XLamp® XR-E LED package for generating a single spectrum of radiation (available from Cree, Inc. of Durham, N.C.). In another exemplary implementation, one or more light sources 301 of the fixture 300 may be an OSTAR-Projection LE ATB A2A LED package, which is a four junction package configured to generate amber, green and blue colors (available from OSRAM Opto Semiconductors GmbH). Additionally, while FIG. 2 illustrates ten light sources 301 disposed on the common mounting board 302, it should be appreciated that lighting fixtures according to various embodiments of the present invention are not limited in this respect, as different numbers of light sources may be disposed and arranged on the common mounting board 302 and included in the lighting fixture 300.

Figure 1:
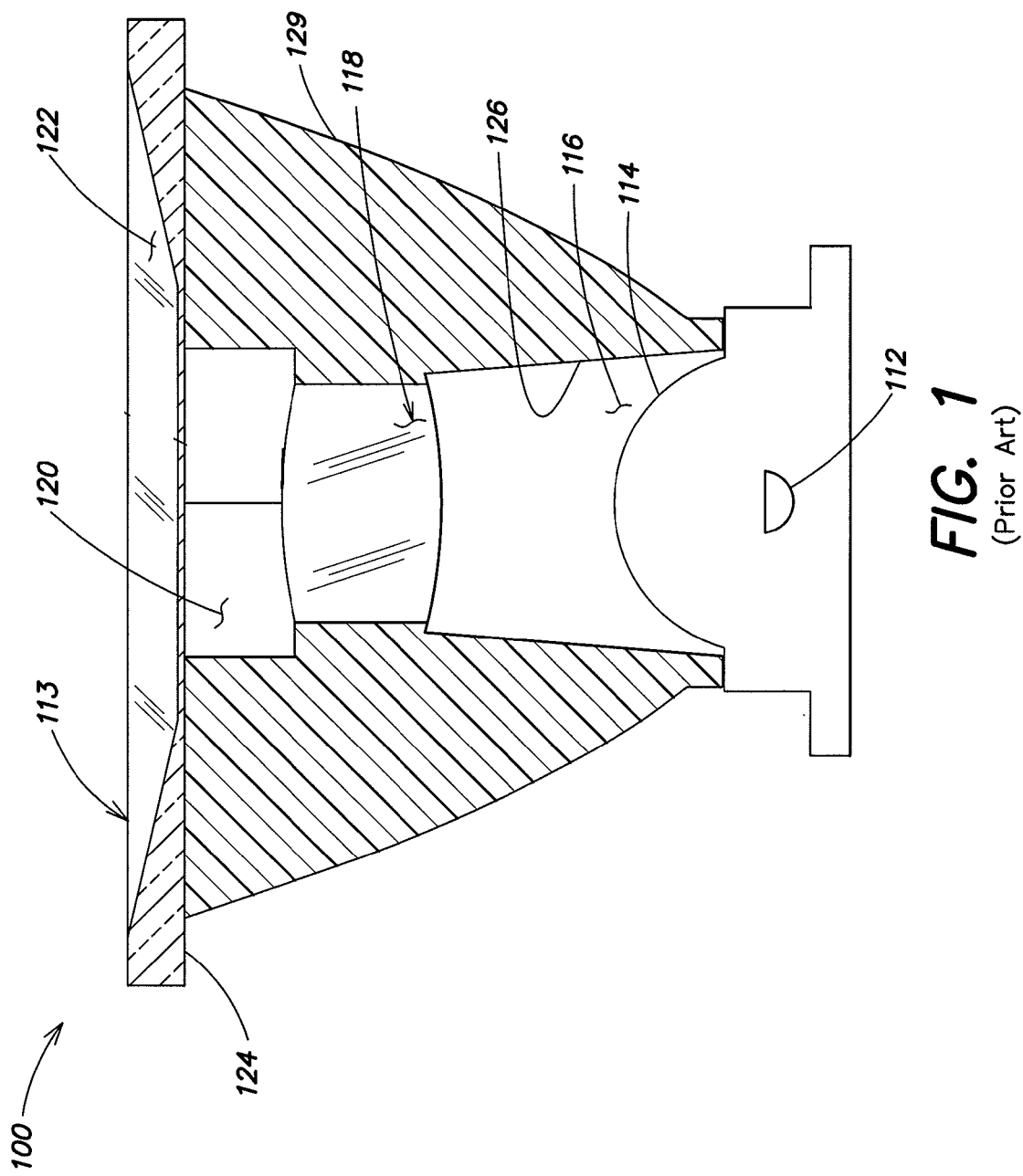
FIG. 1 is a cross-sectional view of a conventional LED collimator.
Figure 3:
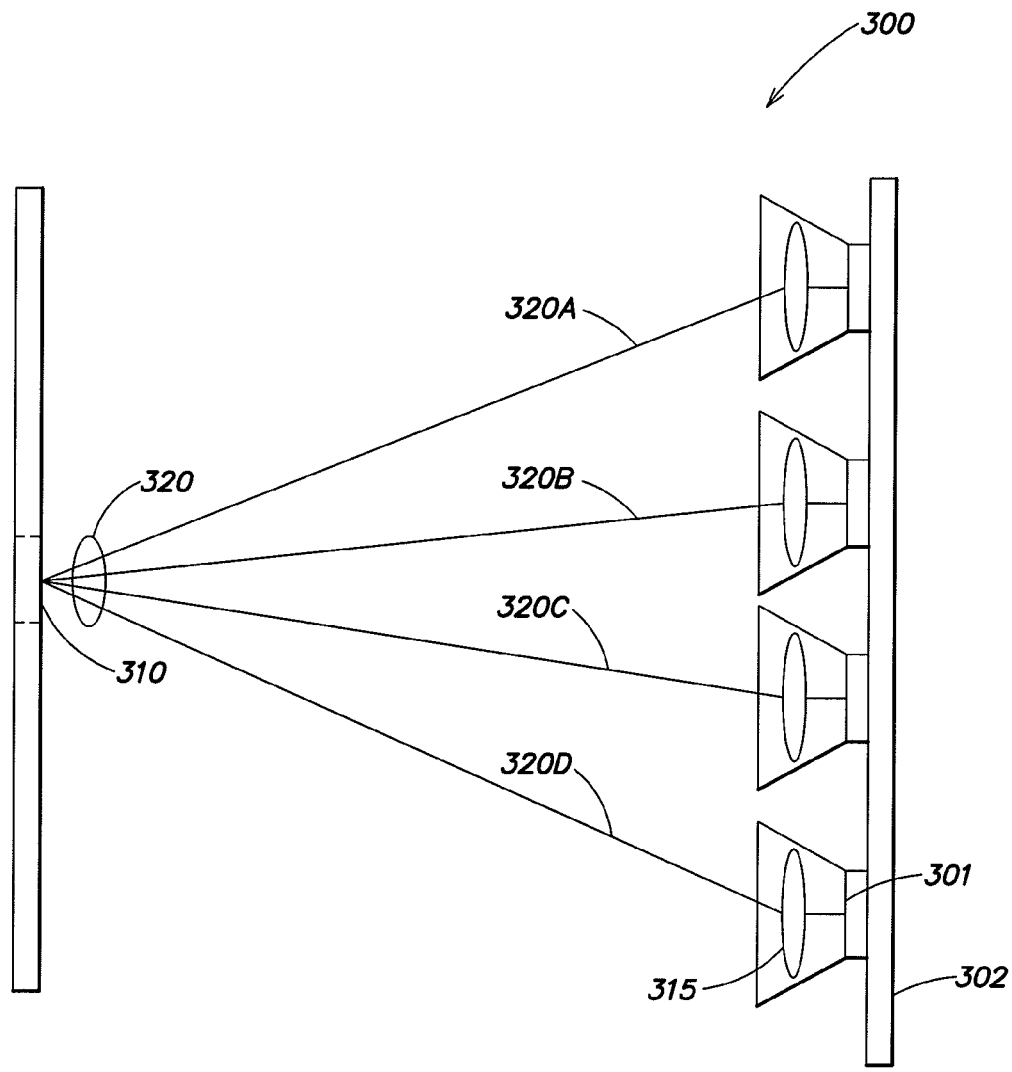
FIG. 3 illustrates a schematic side view of the lighting fixture of FIG. 2, showing a target field illuminated by the lighting fixture, according to one embodiment of the present invention.

As also shown in FIG. 2, each light source 301 may be associated with a collimating optical system or "collimator" 315, similar to that shown in FIG. 1, including a reflector 305 and a lens 309. In one aspect, the lens 309 may include a projective lens system, for example, a convex lens suitable for capturing and directing the light in a desirable direction. In another aspect, the collimators 315 may be based on TIR principles as discussed above in connection with FIG. 1. In the drawing of FIG. 2, the collimators are shown slightly off-center with respect to the corresponding light sources due to the perspective view of the illustration. FIG. 3 illustrates a schematic side view of the lighting fixture 300, showing four light sources 301 and their corresponding collimators 315. As shown in FIG. 3, according to one embodiment, the light sources and collimators are arranged such the lighting fixture 300 produces a high-intensity narrow beam 320 of radiation impinging on a target illumination field 310, and that respective radiation beams 320A, 320B, 320C and 320D projected from each collimator/light source pair substantially overlap in the target illumination field to form the narrow beam 320.

Figure 4:
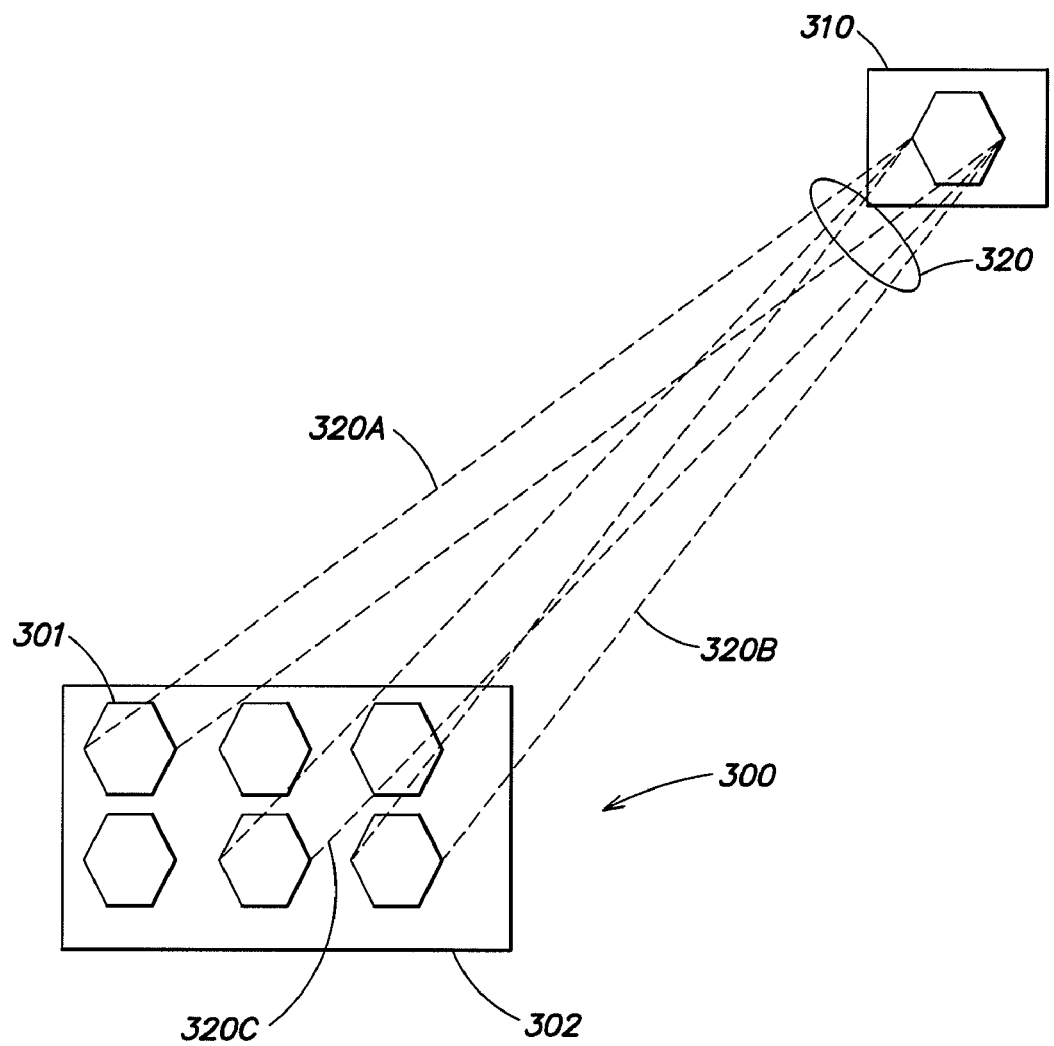
FIG. 4 is an exaggerated view of a far field irradiance distribution pattern for a projection lighting fixture to demonstrate the phenomenon of chip or die imaging.

In some narrow-beam applications involving an LED package (e.g., a COB LED assembly including one or more junctions) and a corresponding collimator, the phenomenon of chip or die imaging may be problematic. In particular, with relatively small collimators used in conjunction with an LED package, the overall geometric shape of the light emitting portion of the LED package itself (e.g., the one or more chips) may create a similar profile in the far field irradiance distribution pattern of the radiation projected from the collimator. FIG. 4 depicts an exaggerated illustration of this phenomenon. An exemplary lighting fixture 300 includes six hexagonally shaped light sources 301 mounted on a common mounting board 302; for purposes of the following discussion, it is assumed that the actual light emitting portion of each source is hexagonal in shape and coupled to a corresponding collimator (not shown in FIG. 4), and that the light sources project respective beams of radiation (e.g., the beams 320A, 320B, and 320C) towards a target illumination field 310 (in practice, as discussed above, the light emitting portion of an LED package including one or more chips generally is square or rectangular). The beams projected from each light source/collimator pair at least partially overlap to form a narrow beam 320 of radiation that impinges upon the target illumination field 310. As shown in FIG. 4, in some instances the far field irradiance distribution pattern of the narrow radiation beam 320 impinging upon the target illumination field 310 may have a general shape that resembles that of the light source chip(s); in this manner, the light emitting portion of an LED package may be "imaged" in the far field due to collimation, and may result in undesirable irradiation non-uniformity in some circumstances. Moreover, with LED packages including multiple junctions that generate respective different wavelengths of light ("multi-color packages," such as RGGB, BGGA and RGBW), spectral non-uniformities may result in the target illumination field 310, in which respective different source spectrums of the multi-color packages are concentrated in different areas of the target illumination field (rather than blended/mixed throughout the target illumination field).

According to one embodiment of the present invention, so as to significantly reduce and in some cases eliminate undesirable irradiance and/or spectral non-uniformity of the target illumination field 310, the orientation of the individual light sources relative to each other on the common mounting board 302 is selected such that their respective light projections, at least partially overlapping in the target illumination field, produce substantially uniform illumination in the target illumination field.

With reference again to FIG. 2, in one embodiment, a first reference axis is chosen for the common mounting board 302 of the lighting fixture. For example, if the common mounting board is rectangular in shape as shown in FIG. 2, any line parallel to one side of the common mounting board may be selected as a first reference axis. In FIG. 2, a first reference axis 510 is selected as a "vertical" axis parallel to the vertical sides of the rectangular common mounting board 302; however, it should be appreciated that a horizontal axis parallel to one of the horizontal sides of the rectangular common mounting board alternatively may serve as a reference axis. More generally, virtually any line in the plane of the common mounting board 302 may serve as a reference axis for the mounting board.

Additionally, a second reference axis for each light source 301 is designated/selected. A second reference axis for each light source may be selected according to any of a variety of criteria, as long as the light source reference axis for each source is designated identically for all light sources to be employed in a given lighting fixture, such that when all light source reference axes are aligned in a same direction, all light sources have a same orientation relative to the first reference axis of the common mounting board. In FIG. 2, the chip area of each of the LED packages serving as light sources 301 has an essentially square or rectangular shape, and for purposes of illustration a light source axis is taken through the center of the chip area, parallel to the longer side of the rectangular shape. Again, other criteria may be used to select a reference axis so as to indicate an orientation of any given light source of the fixture. As shown in FIG. 2, the light source 301A has a corresponding second reference axis 512A, the light source 301B has a corresponding second reference axis 512B, and the light source 301C has a corresponding second reference axis 512C.

According to one embodiment, any line parallel to the first reference axis 510 of the common mounting board 302 may serve as a reference for rotation of any light source in the fixture. Once the first reference axis for the common mounting board 302 is selected, the LED packages serving as the light sources 301 are disposed on the common mounting board 302 such that the orientations of at least two light sources relative to the first reference axis are different. More specifically, as shown in the example of FIG. 2, the light source 301A is rotated such that its axis 512A forms an angle 514A with respect to a line 510A that is parallel to the first reference axis 510. Similarly, the light source 301B is rotated such that its axis 512B forms an angle 514B with respect to a line 510B that is parallel to the first reference axis 510, and the light source 301C is rotated such that its axis 512C forms an angle 514C with respect to a line 510C that is parallel to the first reference axis 510. Generally speaking, any one or more of the light sources 301 may be rotated in a clockwise or counter-clockwise manner, within a plane parallel to the plane of the common mounting board 302, and relative to a line parallel to the first reference axis 510, so that at least two of the light sources have different rotations/orientations (e.g., one light source may not be rotated, i.e., 0 degree rotation, while at least one other light source has a non-zero rotation, or at least two light sources may have respective different non-zero rotations, etc.). It should be appreciated that the rotation of a given light source may be measured with respect to the first reference axis 510, or rotations between different light sources may be measured. For example, in the diagram of FIG. 2, the total rotation angle between the light sources 301A and 301B is determined by subtracting the angle 514B from the angle 514A, whereas the total rotation angle between the light sources 301B and 301C is determined by subtracting the angle 514C from the angle 514B.

In one embodiment, each LED package serving as a light source 301 has a unique orientation/rotation on the common mounting board 302 of the lighting fixture 300. For example, for a given number M of LED packages in the lighting fixture 300, any two LED packages can be disposed with a total rotation angle between their respective axes of nA, where n is an integer ranging from 1 to M−1, and A is an angle determined by dividing a maximum desired rotation span $R_{max}$ by M (and wherein the rotation angle of each source relative to the second reference axis 510 is measured in a same direction, i.e., either clockwise or counter-clockwise).

As discussed further below, in one exemplary implementation involving multi-color LED packages, the maximum desired rotation span $R_{max}$ is taken as 360 degrees; stated differently, the total of M packages of a given lighting fixture are rotated in even or approximately even increments determined by 360/M to cover a maximum rotation span of 360 degrees. In another exemplary implementation involving single-color LED packages, the maximum desired rotation span $R_{max}$ is taken as 90 degrees (i.e., the M packages are rotated in even or approximately even increments determined by 90/M to cover a maximum rotation span of 90 degrees. More generally, the maximum desired rotation span $R_{max}$ may be chosen at least in part based on the rotational symmetry of the LED packages in question for a given fixture. For example, consider a multi-color LED package including four different color chips forming an essentially square light emitting area. The rotational symmetry of such a package is 360 degrees; i.e., if the package is rotated in plane by 360 degrees, it looks the same (hence an appropriate $R_{max}$ for such a package is 360 degrees). In another example, a single-color LED package may include four same color chips forming an essentially square light emitting area; in this example, the rotational symmetry is 90 degrees (i.e., if the package is rotated by 90 degrees, it looks the same), and hence an appropriate $R_{max}$ is 90 degrees. The uniquely-oriented LED packages can be disposed on the common mounting board in various patterns, as long as their projections at least partially overlap in the target illumination field 310, as shown in FIGS. 3 and 4.

Figure 5:
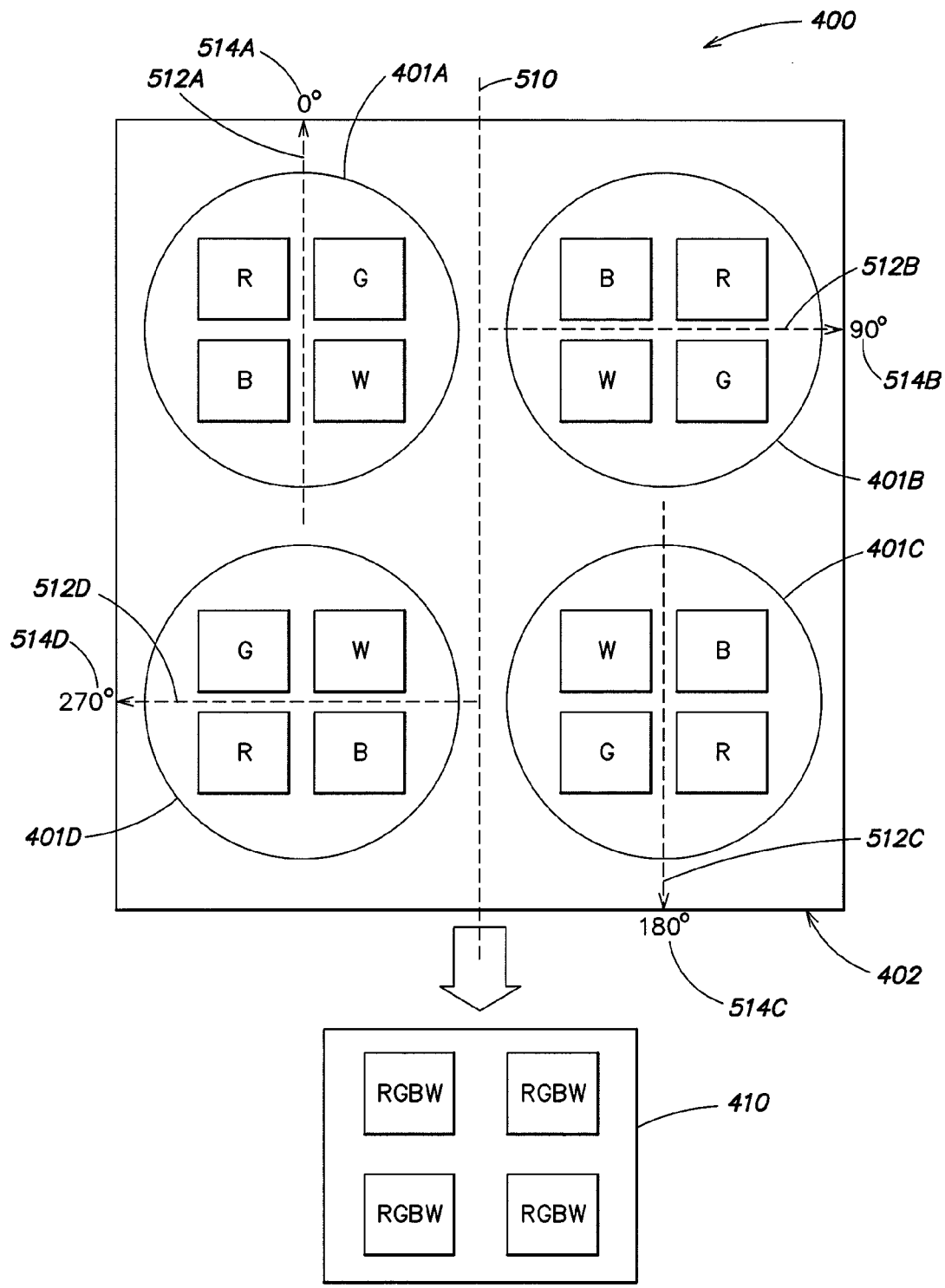
FIG. 5 illustrates a projection lighting fixture employing multi-color LED packages, according to another embodiment of the present invention.

FIG. 5 illustrates a projection lighting fixture 400 employing multi-color LED packages, according to one embodiment of the present invention. A simplified implementation involving only four multi-color light sources 401A, 401B, 401C and 401D is shown in FIG. 5 for purposes of illustrating the concepts discussed above in connection with the rotation of respective multi-color light sources. It should be appreciated that the concepts discussed below in connection with FIG. 5 may be extended to a projection lighting fixture according to the present invention including virtually any number of multi-color light sources.

Referring to FIG. 5, the four multi-color light sources 401A, 401B, 401C and 401D of the lighting fixture 400 are disposed on a common mounting board 402. A reference axis for the board 402 is indicated as the axis 510. In one aspect of this embodiment, the light sources are multi-color LED packages, wherein each LED package may comprise a COB LED assembly including at least four LED junctions configured to generate radiation of four different spectrums (e.g., RGBW). In another aspect, each LED package may include four die or chips, one for each different spectrum, such that the light generating portion of the COB LED assembly for each light source has a square shape. As discussed above, absent any appropriate rotation of one or more sources relative to one or more other sources of the lighting fixture, the far field irradiance distribution profile of a narrow-beam projected from the lighting fixture may have a "squarish" appearance due to the source (chip or die) imaging phenomenon. Additionally, and in some instances more significantly, absent any rotation of light sources the target illumination field may suffer from spectral non-uniformity if same colors of each multi-color LED package are in a same orientation relative to one another. In particular, if all packages have essentially a same orientation, respective different source spectrums of the multi-color packages may be concentrated in different areas of the target illumination field (rather than blended/mixed throughout the target illumination field).

Due to a 360 degree rotational symmetry of the four multi-color LED packages of FIG. 5, each package is disposed at a 90-degree angle (360/4) relative to the adjacent package. More specifically, the package 401A has a reference axis 512A that is rotated by an angle 514A of 0 degrees with respect to the reference axis 510 for the common mounting board 402; similarly, the package 401B has a reference axis 512B that is rotated by an angle 514B of 90 degrees with respect to the reference axis 510, the package 401C has a reference axis 512C that is rotated by an angle 514C of 180 degrees with respect to the reference axis 510, and the package 401D has a reference axis 512D that is rotated by an angle 514D with respect to the reference axis 510. When projected onto a target illumination field 410, the images of the respective light sources 401A, 401B, 401C and 401D overlap, such that the different spectrums R (red), G (green), B (blue) and W (white) are projected into each quadrant in the illumination field and mix together, improving spectral uniformity in the target illumination field 410. In this exemplary embodiment, the source imaging phenomenon may still result in a potentially squarish appearance to the beam pattern; however, spectral uniformity is significantly improved. By employing a higher number of light sources such that the respective rotations are less than 90 degrees, the source imaging phenomenon may be significantly reduced in addition to the increased spectral uniformity.

Figure 6:
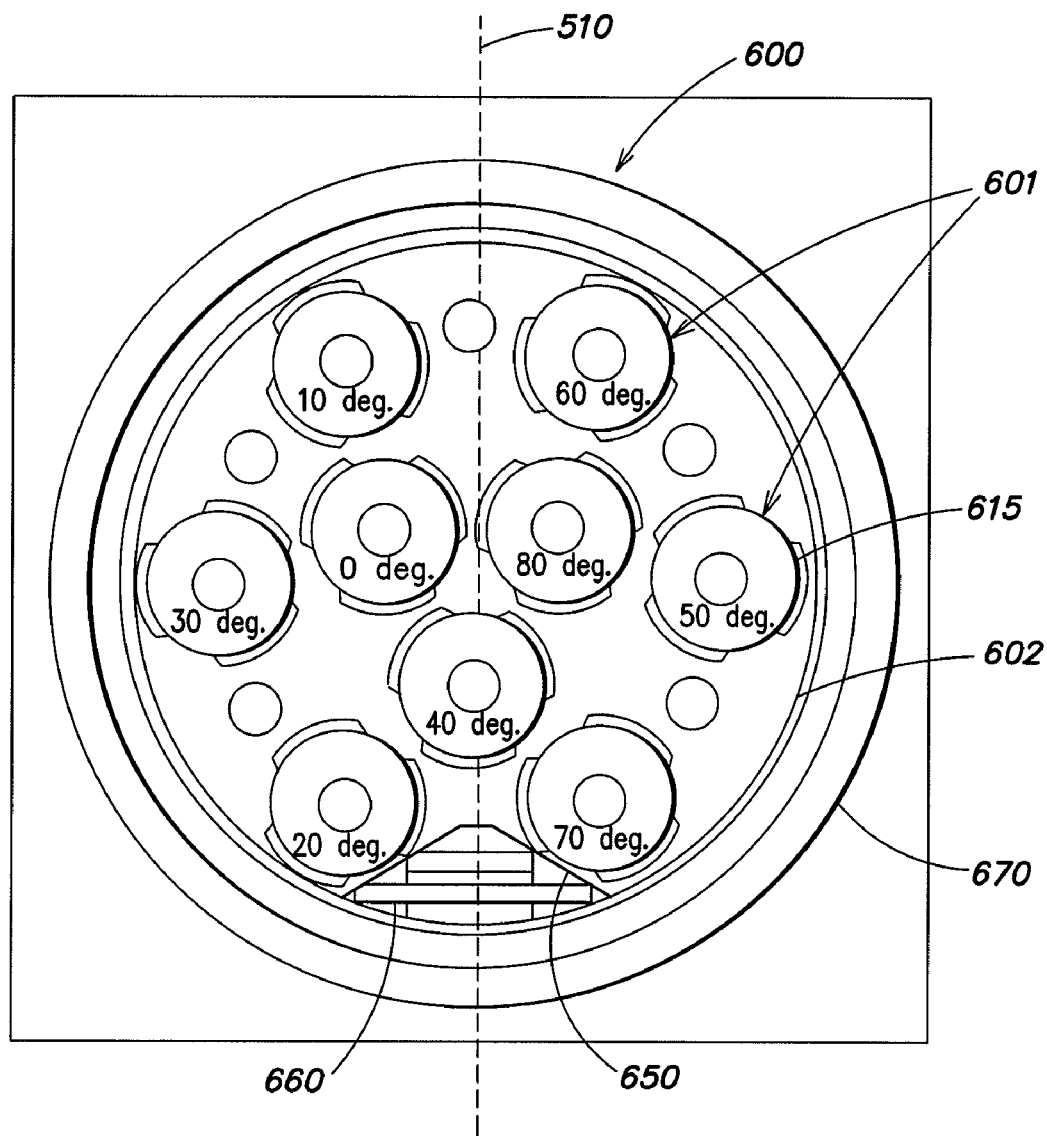
FIG. 6 illustrates a projection lighting fixture employing same-color LED packages, according to another embodiment of the present invention.

The inventive concepts described above in connection with FIGS. 2-5 are fully applicable to single-color multi-LED packages as well. For example, FIG. 6 illustrates a projection lighting fixture 600 according to another embodiment of the present invention employing same-color LED packages. In one aspect, the fixture 600 includes a housing 670 formed to receive an essentially circular common mounting board 602 on which multiple light sources 601 are disposed. In another aspect, the housing 670 includes a key 660 and the common mounting board 602 includes a notch 650 to determine an orientation of the board 602 in the fixture, and establish the reference axis 510 for the common mounting board 602. In one exemplary implementation, each of the light sources 601 includes a corresponding collimator 615, and may comprise a single-color LED package, such as the Cree® XLamp® XR-E LED package (available from Cree, Inc. of Durham, N.C.) having an essentially square light emitting portion of the package. Due to the square geometry and single color, the rotational symmetry for such a package is 90 degrees. Hence, in the exemplary embodiment illustrated in FIG. 6, $R_{max}$ may be taken as 90 degrees, and given nine light sources employed in the fixture, the angle A is 10 degrees, and any two LED packages are disposed with a total rotation angle between their respective axes of nA, where n is an integer ranging from 1 to 8.

Having thus described several illustrative embodiments, it is to be appreciated that various alterations, modifications, and improvements will readily occur to those skilled in the art. Such alterations, modifications, and improvements are intended to be part of this disclosure, and are intended to be within its spirit and scope. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments. Accordingly, the foregoing description and attached drawings are by way of example only, and are not intended to be limiting.

The invention claimed is:

1. A lighting apparatus, comprising:
an essentially planar mounting board having a first reference axis in a first plane defined by the mounting board; and
a plurality of LED-based light sources disposed on the mounting board, each light source comprising an LED package including a chip-on-board assembly of multiple LED chips and a collimator coupled to the LED package, each light source having a second reference axis indicating an orientation of the light source, the second reference axis for each light source being designated identically for all light sources of the plurality of light sources, wherein the plurality of LED-based light sources are disposed on the mounting board such that a first orientation of a first light source of the plurality of light sources, relative to the first reference axis of the mounting board, is different from at least one other orientation of at least one other light source of the plurality of light sources relative to the first reference axis of the mounting board.

2. The apparatus of claim 1, wherein at least the first orientation of the first light source is based at least in part on at least one emission spectrum of the multiple LED chips.

3. The apparatus of claim 2, wherein at least the first orientation of the first light source is based at least in part on a rotation symmetry of the at least one emission spectrum of the multiple LED chips.

4. The apparatus of claim 1, wherein the multiple LED chips are arranged in the chip-on-board assembly so as to form a light emission area having a geometric shape, and wherein at least the first orientation of the first light source is based at least in part on a rotation symmetry of the geometric shape.

5. The apparatus of claim 1, wherein each light source of the plurality of light sources has a unique orientation relative to the first reference axis of the mounting board.

6. A method for providing uniform projection lighting, the method comprising:
arranging a plurality of LED-based light sources on an essentially planar mounting board such that at least two LED-based light sources of the plurality of LED-based light sources have different orientations on the common mounting board, each light source comprising an LED package including a chip-on-board assembly of multiple LED chips and a collimator coupled to the LED package,
wherein
the plurality of LED-based light sources, when energized, project a corresponding plurality of collimated light beams toward a target illumination field, the beams at least partially overlapping in the target illumination field,
the essentially planar mounting board has a first reference axis in a first plane defined by the mounting board;
each light source has a second reference axis indicating an orientation of the light source, the second reference axis for each light source being designated identically for all light sources of the plurality of light sources; and
the plurality of LED-based light sources are disposed on the mounting board such that a first orientation of a first light source of the plurality of light sources, relative to the first reference axis of the mounting board, is different from at least one other orientation of at least one other light source of the plurality of light sources relative to the first reference axis of the mounting board.

7. The method of claim 6, wherein at least the first orientation of the first light source is based at least in part on at least one emission spectrum of the multiple LED chips.

8. The method of claim 7, wherein at least the first orientation of the first light source is based at least in part on a rotation symmetry of the at least one emission spectrum of the multiple LED chips.

9. The method of claim 6, wherein the multiple LED chips are arranged in the chip-on-board assembly so as to form a light emission area having a geometric shape, and wherein at least the first orientation of the first light source is based at least in part on a rotation symmetry of the geometric shape.

10. The method of claim 6, wherein each light source of the plurality of light sources has a unique orientation relative to the first reference axis of the mounting board.

11. A projection lighting apparatus, comprising:
an essentially planar mounting board having a first reference axis in a first plane defined by the mounting board; and
a plurality of LED packages disposed on the mounting board, each LED package comprising a chip-on-board assembly of multiple LED chips and a collimator coupled to the chip-on-board assembly, each LED package having a second reference axis indicating an orientation of the package, the second reference axis for each package being designated identically for all packages of the plurality of packages,
wherein the plurality of LED packages are disposed on the mounting board such that each package has a unique orientation relative to the first reference axis of the mounting board.

12. The apparatus of claim 11, wherein the unique orientation of each package is based at least in part on a rotation symmetry of at least one emission spectrum of the multiple LED chips.

13. The apparatus of claim 11, wherein the multiple LED chips are arranged in the chip-on-board assembly so as to form a light emission area having a geometric shape, and wherein the unique orientation of each package is based at least in part on a rotation symmetry of the geometric shape.

14. The apparatus of claim 11, wherein a total number of the plurality of LED packages disposed on the mounting board is M, wherein a rotation symmetry of each LED package is $R_{max}$, and wherein a rotation angle between any two packages of the plurality of packages is nA, wherein $A=R_{max}/M$, and n is an integer in a range of from 1 to (M−1).

15. The apparatus of claim 14, wherein $R_{max}$ equals 360 degrees.

16. The apparatus of claim 14, wherein $R_{max}$ equals 90 degrees.

* * * * *